United States Patent [19]

Wurmb et al.

[11] 4,096,318

[45] Jun. 20, 1978

[54] RECHARGEABLE ACCUMULATOR HAVING A MANGANESE DIOXIDE ELECTRODE AND AN ACID ELECTROLYTE

[75] Inventors: Rolf Wurmb, Heidelberg; Fritz Beck, Ludwigshafen; Gerd Wunsch, Speyer; Klaus Boehlke; Wolfram Treptow, both of Ludwigshafen, all of Germany

[73] Assignee: BASF Aktiengesellschaft, Ludwigshafen, Germany

[21] Appl. No.: 787,522

[22] Filed: Apr. 14, 1977

Related U.S. Application Data

[63] Continuation of Ser. No. 623,816, Oct. 20, 1975, abandoned.

[30] Foreign Application Priority Data

Oct. 26, 1974 Germany .............................. 2451017

[51] Int. Cl.² ............................................. H01M 6/04
[52] U.S. Cl. ................................... 429/199; 429/203; 429/204; 429/221; 429/222; 429/224; 429/225; 429/229

[58] Field of Search ............... 429/204, 199, 203, 221, 429/222, 224, 225, 226, 229, 230

[56] References Cited

U.S. PATENT DOCUMENTS

| 2,496,709 | 2/1950 | Gelardin | 429/155 |
|---|---|---|---|
| 3,390,014 | 6/1968 | Eisler | 429/150 |
| 3,576,674 | 4/1971 | Ruben | 429/204 |
| 3,816,177 | 6/1974 | Walsh | 429/194 |
| 3,939,010 | 2/1976 | Coleman et al. | 429/204 X |

*Primary Examiner*—Charles F. LeFevour
*Attorney, Agent, or Firm*—Keil, Thompson & Shurtleff

[57] ABSTRACT

An accumulator having an acid electrolyte and possessing two electrodes of the first kind mounted on base electrodes. The active material on the positive side contains manganese dioxide. The base electrode on the negative side consists of powdered graphite embedded in a binder which is resistant to the electrolyte. The base electrode on the positive side has a coarse porous structure and consists of graphite or titanium coated with titanium nitride or titanium carbide. The average pore diameters are from 0.1 to 2 mm and the pore volume is from 20 to 70%.

8 Claims, No Drawings

RECHARGEABLE ACCUMULATOR HAVING A MANGANESE DIOXIDE ELECTRODE AND AN ACID ELECTROLYTE

This is a continuation, of application Ser. No. 623,816 filed Oct. 20, 1975 now abandoned.

The present invention relates to an accumulator (galvanic secondary cell) having two electrodes of the first kind mounted on base electrodes, the cathode containing manganese dioxide as active material.

Present-day accumulator research aims at finding accumulators which are suitable for driving electric vehicles. The main demands are that the accumulators should be capable of being easily subjected to frequent charge-discharge cycles and exhibit a favorable energy-weight ratio.

To achieve these aims, it has been proposed to improve further the so-called lead sulfate accumulator and also to use solution accumulators, (U.S. Pat No. 1,425,163, U.K. Pat. No. 449,893). In the latter accumulators, the active materials are present in the aqueous electrolyte in solution when the accumulator is discharged. The advantage of these accumulators over the lead sulfate accumulator is the improved power-to-weight ratio, since light base electrodes and conductors can be used. Furthermore, there is 100% utilisation of the active materials, since the active oxide or metal particles are not enclosed by non-conducting discharge products as is the case in the lead accumulator. Suitable positive active materials are, in particular, $PbO_2$ and $MnO_2$ and suitable negative active materials are Pb, Cd and Zn. By contrast with the lead accumulator, the following energy values per unit weight are obtained in some examples for the usual acid concentrations:

| System | Electrolyte acid | Concentration (% w/w) | Whr/kg |
|---|---|---|---|
| Pb/PbO$_2$ | H$_2$SO$_4$ | 30 | 30 |
| Pb/PbO$_2$ | HClO$_4$ | 50 | 50 |
| Zn/MnO$_2$ | H$_2$SiF$_6$ | 34 | 93 |
| Zn/MnO$_2$ | HBF$_4$ | 50 | 84 |
| Zn/MnO$_2$ | HClO$_4$ | 72 | 102 |
| Zn/MnO$_2$ | NH$_2$SO$_3$H | 18 | 35 |

In the above table, the weight of current leads, base electrodes and the material of the container has been taken into consideration as being about 25% of the total weight of the accumulator and a capacity utilization of 90% has been assumed. Thus the energy values obtained show an improvement over the lead accumulator by factors of up to 3.

The drawback of prior art solution accumulators is essentially their poor charge-discharge cycling properties. Furthermore, in the MnO$_2$ accumulator, the MnO$_2$ is deposited only with poor current yields. Furthermore, since the current yields on charging are different on the cathode and anode sides, the active materials are asymmetrically deposited and the power output of the accumulator is restricted by the active material deposited in poor current yield.

Finally, German Published Application 1,496,192 discloses an accumulator which has a base electrode of titanium on the cathode side (positive side) to which a pyrolytically produced coating of a metal oxide, i.e., manganese dioxide or lead dioxide, has been applied. The base electrode consists of titanium and is advantageously porous. A zinc electrode is used on the anode side (negative side), whilst the electrolyte is an acidic aqueous solution containing zinc ions, e.g. a solution of zinc sulfate having a pH of 4.5. In this accumulator system the cathode constitutes an electrode of the second kind, since on discharging the manganese dioxide is reduced to manganese (III) oxide which remains on the base electrode. However, at the anode zinc passes into solution and this is therefore an electrode of the first kind. During charging, zinc is deposited on the anode and the Mn$_2$O$_3$ is oxidized to MnO$_2$. This accumulator is therefore not a solution accumulator.

It is an object of the present invention to provide an accumulator having two electrodes of the first kind mounted on base electrodes, the cathode being a manganese dioxide electrode, wherein the active materials are uniformly deposited on both base electrodes at high current yield.

We have now found that this object is achieved when the base electrode on the negative side consists of powdered graphite embedded in a binder which is resistant to the electrolyte and the base electrode on the positive side has a coarse porous structure and consists of graphite or titanium coated with titanium nitride or titanium carbide and has an average pore diameter of from 0.1 to 2 mm and a pore volume of from 20 to 70%.

When using the base electrodes of the invention on the negative side, these consisting of powdered graphite embedded in a binder which is resistant to the electrolyte, it is possible to obtain a considerable increase in current yield of the metal deposition even at relatively low current densities. The following table lists some current yields obtained with pure graphite base electrodes and with base electrodes of the invention:

Table 1

| | | | |
|---|---|---|---|
| Current yield of zinc deposition from a molar solution of Zn[BF$_4$]$_2$ or a molar solution of Zn[SiF$_6$] (pH = 2) onto graphite or graphite-filled plastics electrodes (80% w/w of graphite having a grain size of 0.2 mm and 20% w/w of polypropylene) at various current densities. T = 25° C. (CY = current yield). | | | |
| Base material | Electrolyte acid | CY (i=10mA/cm$^2$) | CY (i=50mA/cm$^2$) |
| Graphite | HBF$_4$ | 50% | 66% |
| | H$_2$SiF$_6$ | 76% | 80% |
| graphite-filled plastics | HBF$_4$ | 84% | 89% |
| | H$_2$SiF$_6$ | 90% | 94% |

Graphite-filled plastics electrodes have a density of from 1.6–1.8 g/cm$^3$ and are therefore in the same range as conventional types of graphite (1.6–1.9 g/cm$^3$). Due to their good mechanical stability, however, they can be produced in very small thicknesses down to sheeting thicknesses, unlike pure graphite electrodes, and this provides a distinct improvement in the energy/weight ratio of the accumulators. In this way it is also easy to produce bipolar electrodes. A prerequisite is that the plastics material used does not react with the electrolyte in the battery and is not attacked by the products produced during charge-discharge cycling. In long-term charge-discharge cycle tests polypropylene, polyethylene and polyvinyl chloride have been found to be particularly suitable plastics material. The graphite powder may have a particle size of from 1 to 500 μ. The purity of the graphite depends on the requirements placed on the charge-discharge cycling properties of the battery. For example, in the case of the deposition of Zn, Cd or Mn, the graphite should be very pure and have an ash content of from 0.1 to 0.5% w/w, i.e., it must be free from impurities such as Fe, Co, Ni and Cu. The presence of traces of such metals may hinder the cathodic deposition of the metal or assist corrosion thereof.

The base electrodes may be made either by compression molding at temperatures at which the binder is thermoplastic, e.g. temperatures of about 250° C, or by injection molding.

Another advantage of the graphite-filled plastics electrodes is the absence of porosity in the material. Whereas all types of graphite show a certain amount of porosity, blending and compression of graphite with plastics provide a non-porous electrode which ensures that no electrolyte can penetrate into the electrode and destroy it. Thus the life of the base electrodes of the invention is much longer than that of conventional base electrodes.

The binder is filled with graphite to the extent of from 50 to 80% by weight depending upon the desired conductivity of the electrode. We prefer to use electrodes containing from 60 to 80% w/w of graphite and from 40 to 20% w/w of binder, these having a specific conductivity of from 1 to 3 S/cm. To reduce the contact problem, electrodes may be made in sandwich fashion using two graphite-filled panels between which a metal plate or gauze is enclosed.

Deposition of the metals Cd, Fe, Zn and Mn from corresponding aqueous salt solutions onto the electrodes of the invention takes place in a uniform layer and without the formation of dendrite.

Also important, however, is the base electrode on the positive side. Manganese dioxide is deposited on to prior art smooth electrodes only at poor current yields. For example, the Ahr-yield obtained in the deposition of manganese dioxide onto a smooth and hardly porous graphite electrode, is, at full charge and irrespective of the active material on the negative side, only 5.5% (Whr-yield 1.1%). If shaped bodies consisting of binders in which graphite is embedded and having the aforementioned useful properties on the negative side are used as base electrodes on the positive side, Ahr-yields of only 4.0% and Whr-yields of 1.5% are obtained.

These yields are considerably increased when use is made of the base electrodes of the invention which have coarse pores. Suitable materials for the manufacture of these base electrodes are those which are not passivated, e.g. titanium coated with titanium carbide or titanium nitride, but preferably graphite. The purity of the graphite depends on the demands made on the battery, particularly as regards its charge-discharge cycling properties. It is convenient to use a graphite having an ash content of 0.1 to 0.5% by weight and which is virtually free from impurities such as iron, cobalt and nickel. Preferably, the base electrodes of the invention have an average pore diameter of from 0.5 to 1 mm and a pore volume of at least 20% preferably from 40 to 60%.

Advantageously, the electrolyte flows through the positive base electrodes.

Table 2

Ahr and Whr yields of a solution accumulator having positive base electrodes of different structures. Negative base electrode: graphite-filled polypropylene (80% by weight of grahite). Electrolyte: molar solutions of $Mn[BF_4]_2$ and $Zn[BF_4]_2$. Full charge and deep discharge at i = 0.5 $A/dm^2$. T = 25° C.

| Base material positive | Ahr yield | Whr yield |
|---|---|---|
| smooth graphite graphite-filled polypropylene | 5.5% | 1.1% |
| 80% w/w graphite, smooth surface | 4.0% | 1.5% |

Table 2-continued

Ahr and Whr yields of a solution accumulator having positive base electrodes of different structures. Negative base electrode: graphite-filled polypropylene (80% by weight of grahite). Electrolyte: molar solutions of $Mn[BF_4]_2$ and $Zn[BF_4]_2$. Full charge and deep discharge at i = 0.5 $A/dm^2$. T = 25° C.

| Base material positive | Ahr yield | Whr yield |
|---|---|---|
| Graphite, waffle-like structure Increase in area 1.8 times | 20% | 10% |
| Graphite electrode with coarse pores, pore volume 30%, pore diameter 0,2 –0.5 mm. No flow of electrolyte therethrough. | 55-60% | 30-40% |
| Graphite electrode with coarse pores, pore diameter 0.5 to 1 mm, pore volume 40%. Electrolyte flows therethrogh | 80-90% | 60-70% |

Suitable active materials on the negative side are, in particular, zinc and also cadmium, iron (in diaphragm cells), manganese and lead.

Suitable electrolytes are all acids which form soluble salts with the said metals and have oxidation resistant anions, e.g. sulfuric acid, tetrafluoroboric acid, hexafluorosilicic acid, perchloric acid and amidosulfonic acid, sulfuric acid not being used, of course, when lead is employed. The acids are used in concentrations and amounts such that the pH of the electrolyte is below 1 after charging and not more than 3 after discharging.

The accumulator of the invention not only has the above advantages over the accumulator disclosed in German Published Application 1,496,192 but also has the further advantage that it has a higher cell potential and can be more heavily loaded. The capacity of the accumulator of the invention, as related to the manganese dioxide deposited during charging, is also higher, since in this case the manganese dioxide used as active material is converted during discharge to the divalent state and not, as in the prior art accumulator, only to the trivalent state.

EXAMPLE 1

20% by weight of polypropylene and 80% by weight of iron-free graphite having grain sizes of from 1 to 4 μ are blended in a twinworm kneading machine. The product is compressed at 250° C for 10 minutes under a pressure of 100 kg/cm². The specific conductivity of the resulting base electrode (measuring 220 × 220 × 2 mm) is 1.5 to 2 S/cm. Prior to use in an accumulator, the panels are trimmed to the desired size and the surface is freed from residues of polypropylene. This may be effected by simple scraping or the use of a sand jet.

The plastics plates thus prepared are used as negative base electrode in a solution accumulator cell. Contact is provided by the plates themselves or by a metallic conductor pressed between two graphite-filled polypropylene plates. The positive is a coarsely porous graphite electrode having a pore volume of 40% (pore diameters 0.5 to 1 mm) and a thickness of 5 mm, this being disposed between two negatives. The volume of the cell is 120 ml. The electrolyte is fed to one chamber of the cell and withdrawn from the other chamber at the bottom of the cell by means of a low-consumption pump. In this way, electrolyte slowly flows through the positive. The electrolyte contains a molar solution of $Cd[BF_4]_2$ and a molar solution of $Mn[BF_4]_2$ (pH = 1). The cell is charged and discharged at a rate of 1 $A/dm^2$. The charging time is 5.8 hours (conversion 90%). The cell is subjected to 200 charge-discharge cycles and gives an average Ahr yield of 82% and an average Whr yield of 65%. Deep discharge of the cell is effected to a cell potential of 0.7 volts.

EXAMPLE 2

A solution accumulator cell as described in Example 1 is used except that the electrolyte consists of a molar solution of $Zn[ClO_4]_2$ and a molar solution of $Mn[ClO_4]_2$. The current density for charging and discharging is 0.5 A/dm$^2$ and the charging time is 11.6 hours (conversion 90%). Over 170 cycles the average Ahr yield of the cell is 80% and the average Whr yield is 60%, deep discharge being effected to a cell potential of 0.7 volts.

We claim:

1. An accumulator which can be alternately charged and discharged having two electrodes of the first kind mounted on base material, wherein in said first kind electrodes all the active material passes into solution on discharge which comprises:

(a) on the positive side, an electrode of the first kind mounted on a base material, said electrode containing manganese dioxide as active material, said base material having a coarsely porous structure with an average pore diameter of from 0.1 to 2 mm and a pore volume of from 20 to 70% and selected from the group consisting of titanium coated with titanium nitride, titanium coated with titanium carbide, and graphite;

(b) on the negative side, an electrode of the first kind mounted on a base material, said electrode selected from the group consisting of zinc, cadmium, iron, manganese and lead as the active material, and said base material consisting of powdered graphite embedded in a plastics binder which is resistant to the electrolyte whereby said base material is non-porous; and (c) an acid electrolyte, said acid being selected from the group consisting of sulfuric acid, tetrafluoroboric acid, hexafluorosilicic acid, perchloric acid, and amidosulfonic acid, wherein said acids form soluble salts with the metals of the active materials and have oxidation resistant anions with the proviso that when lead is used as an active material on the negative side, sulfuric acid cannot be used.

2. An accumulator as set forth in claim 1, wherein the binder is polyethylene, polypropylene or polyvinyl chloride.

3. An accumulator as set forth in claim 1, wherein the graphite powder has a grain size of from 1 to 500 $\mu$.

4. An accumulator as set forth in claim 1, wherein the base material on the positive side has a pore diameter of from 0.5 to 1 mm and a pore volume of at least 20% and preferably of from 40 to 60%.

5. An accumulator as set forth in claim 1, wherein the electrolyte flows through the base material on the positive side.

6. An accumulator as set forth in claim 1, wherein the active material on the negative side is zinc.

7. An accumulator as set forth in claim 1, wherein the base material on the positive side consists of graphite.

8. An accumulator as set forth in claim 1, wherein the binder comprises from 50 to 80% by weight, based on the weight of the electrode, of graphite.

* * * * *